T. F. HAMMER.
Molding-Machine.
No. 8,007. Reissued Dec. 25, 1877.
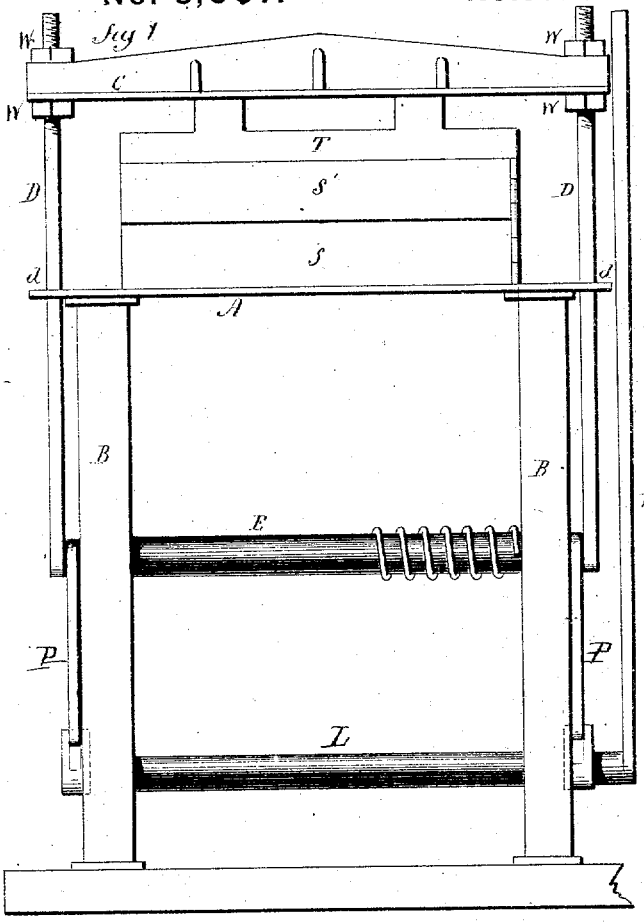
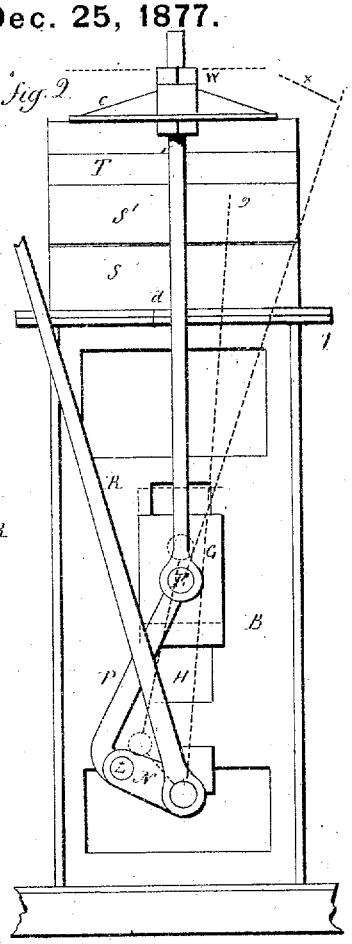
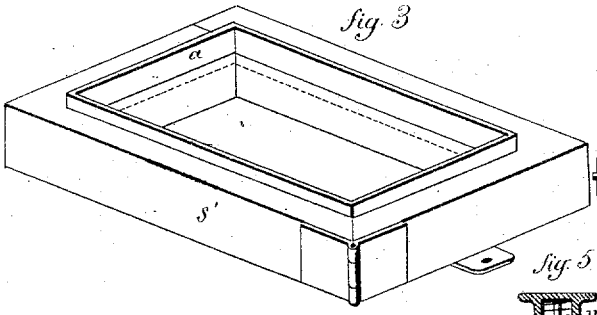
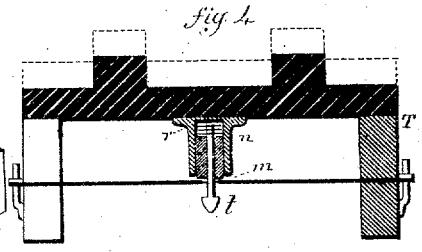
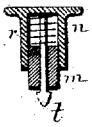
Witnesses.
J. H. Chumney
Clara Broughton
Thorwald F. Hammer
Inventor.
By atty.
Wm. E. Earle

UNITED STATES PATENT OFFICE.

THORVALD F. HAMMER, OF BRANFORD, CONNECTICUT.

IMPROVEMENT IN MOLDING-MACHINES.

Specification forming part of Letters Patent No. 161,784, dated April 6, 1875; Reissue No. 8,007, dated December 25, 1877; application filed February 28, 1877

*To all whom it may concern:*

Be it known that I, THORVALD F. HAMMER, of Branford, in the county of New Haven and State of Connecticut, have invented a new Improvement in Molding-Machines; and I do hereby declare the following, when taken in connection with the accompanying drawings, and the letters of reference marked thereon, to be a full, clear, and exact description of the same, and which said drawings constitute part of this specification, and represent in—

Figure 1, a front view; Fig. 2, a side view; and in Figs. 3, 4, and 5, detached views.

This invention relates to an improvement in machines for forming molds preparatory to making metal castings, the object being to avoid the usual tamping, and thereby facilitate the preparation of the mold; and it consists in the construction or combination of parts, as hereinafter described, and more particularly recited in the several clauses of claim.

A is the bed of the machine, mounted on uprights B B. C is the upper platen, hung by a rod, D, at each side, upon a pivot, at a point below the bed, as at the shaft E, and so that the platen may be turned away from its position over the bed, as indicated in broken lines, Fig. 2. A suitable stop or stops, *d*, is arranged to stop the platen when it shall have been brought to its proper relative position over the bed. On the shaft E is a spring, F, (may be weight or other equivalent device,) the tendency of which is to turn the platen to or support it in its horizontal position over the bed and against the stop or shoulder *d*, the spring, however, allowing the platen to be turned backward, as indicated by the broken line *x*, Fig. 2. The shaft E rests in a block, G, at each end, these blocks working freely up and down in a slot, H, in the uprights B. Below the shaft E is a rock-shaft, L, parallel to the shaft E, on which are two cranks, N, each of which connect by a rod, P, to the shaft E. The shaft L is turned by means of a lever, R, so that by forcing the lever R back to the position denoted in broken lines *z*, the shaft E, and with it the platen C, will be raised, as denoted in broken lines; or by drawing the lever forward the platen C will be drawn down accordingly.

This completes the construction of the machine. The bed A forms the molding-bench. On this (the platen having been turned back) the parts *s s'* of a match-flask are placed, the pattern arranged betwen the two in the usual manner, the lower part having been previously prepared to support the pattern. The upper part is then filled with sand a little more than full—that is, so that the sand will project above the flask to the extent of the compression desired; then onto this sand the board T is placed, and the platen C turned forward over the board, and, by means of the lever R, forced down onto the sand to compress it into the flask; or, if desired, the board may be left off, and the platen brought directly onto the sand, and then the board applied for the removal of the flask, in the usual manner.

This completes the molding, and the usual labor of tamping is avoided, and an even compression of the sand attained.

The platen is made adjustable relatively to the bed by nuts *w*. In order to conveniently bank the sand in the flask, and at the same time be able to strike off the surplus, a thin hoop, *a*, is a placed in the flask at the upper edge, as seen in Fig. 3, projecting above the surface of the flask to the extent required for banking the sand. The surplus may be struck off to this hoop in the usual manner; then, when the platen is brought down, the hoop will pass down into the flask with the sand, to remain there or be removed for use in other flasks.

To form the opening for the sprue, the plug is made extensible—that is, an external tube or sleeve, *n*, with an internal follower, *m*, and a spring, *r*, to force the follower *m* outward, the follower prevented from escaping entirely from the sleeve by a headed spindle, *t*, as seen in Fig. 5. This is set into the mold, and its height, when extended, is greater than the depth of the flask, and hence the banking will project above the flask, as denoted in broken lines, Fig. 5; but when the platen is brought down it will force the sleeve onto the follower, down flush with the flask, as seen in Fig. 4, and when the pressure is removed the sleeve will be forced from the sand and afford a handle by which to draw the plug from the sand, and leave the hole for the sprue in the desired form.

I do not broadly claim an attachment to or auxiliary part of the flask, whereby the sand may be banked prior to compression, as such, I am aware, is not new.

I do not broadly claim a compressing-platen, hung so as to swing away from and be returned over the flask, as such, I am aware, is not new.

Neither do I broadly claim a compressible sprue-plug, as such, I am aware, is not new; but in such known construction it was necessary to attach one part of the plug to the pattern, and a second compressible part to the upper platen.

I claim—

1. In a molding-machine, the upper platen, rigidly attached at each end to a vertical rod hinged below the flask, substantially as specified.

2. In a molding-machine, the upper platen, rigidly attached at each end to a vertical rod hinged below the flask, and made adjustable as to height, substantially as described.

3. In a molding-machine, the upper platen, attached at each end to a vertical rod hinged below the flask, and made adjustable, as to height, substantially as described.

4. In a molding-machine, the upper platen, hung below and so as to be turned away from over the flask, combined with a stop to arrest the platen when turned to its proper relative position over the flask, substantially as described.

5. The combination of the stationary bed A, the platen C, hung by rods D to the shaft E, the spring F for turning said shaft, the rock-shaft L, connected to the shaft E, and the lever R, substantially as described.

6. In combination with the molding-flask, the hoop *a*, fitting the inside of the flask, and so as to be forced down into the flask with the sand, substantially as set forth.

7. A sprue-plug consisting of the sleeve *n*, follower *m*, and spring *r*, combined with means to prevent the separation of the follower from the sleeve, constructed, as described, so as to be arranged in the flask before pressure is applied to the sand, and without connection with the platen, substantially as described.

THORVALD F. HAMMER.

Witnesses:

JOHN E. EARLE,

CLARA BROUGHTON.